Jan. 15, 1935.  F. W. PARKS  1,987,704
PEDAL DEPRESSOR
Filed Sept. 30, 1929  2 Sheets-Sheet 1
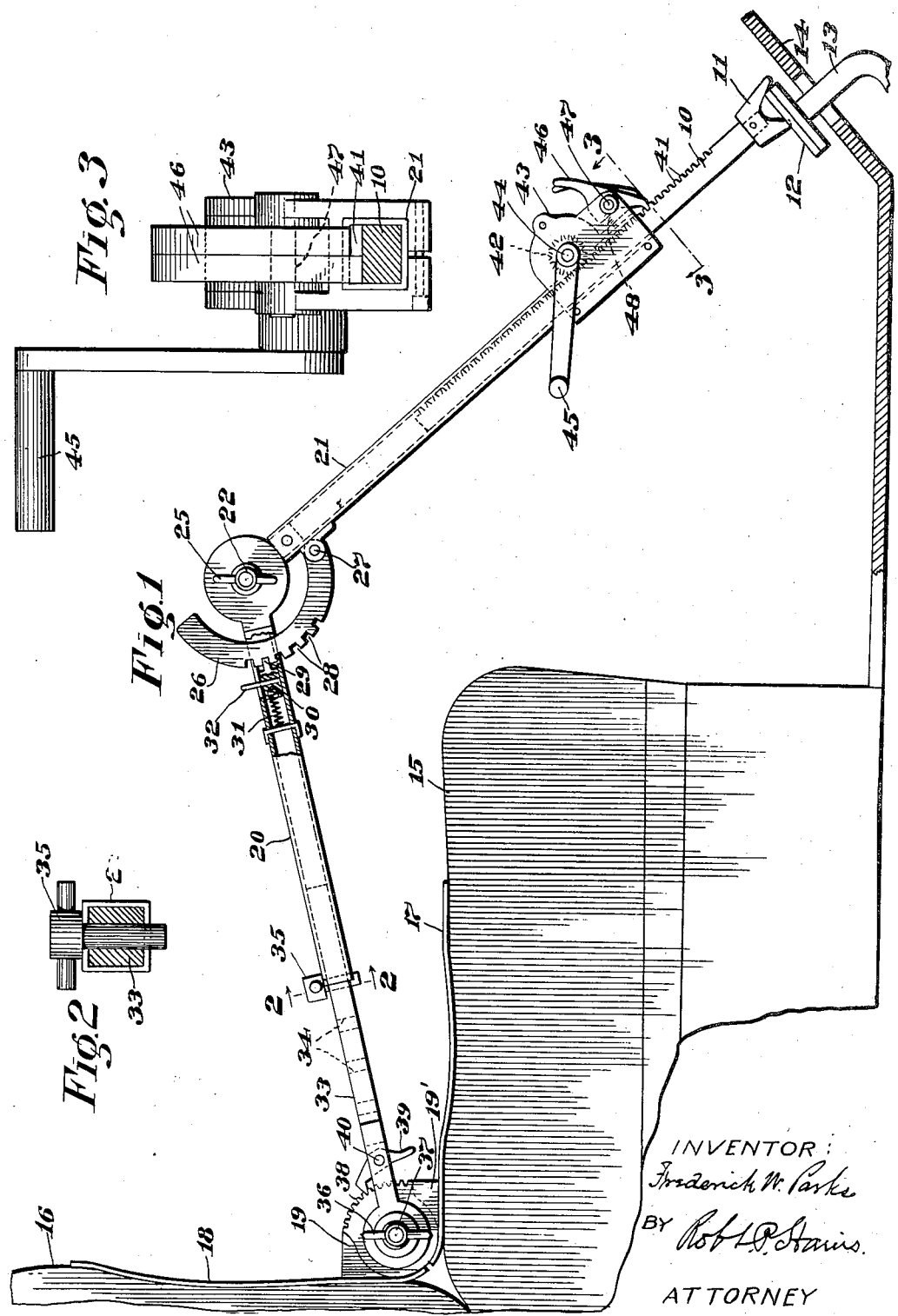

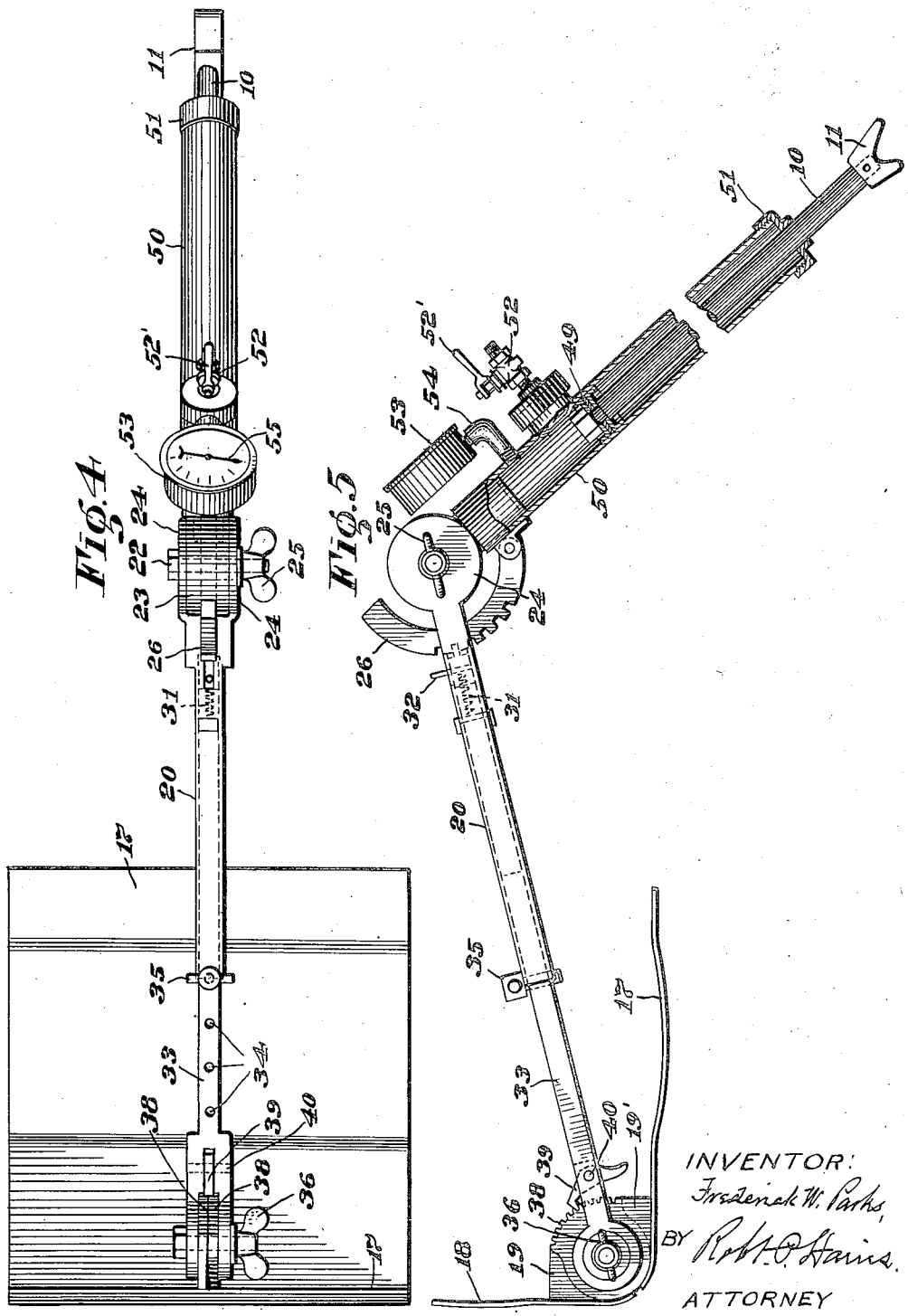

Patented Jan. 15, 1935

1,987,704

UNITED STATES PATENT OFFICE 1,987,704

PEDAL DEPRESSOR

Frederick W. Parks, Fitchburg, Mass., assignor to Bendix-Cowdrey Brake Tester, Inc., Fitchburg, Mass., a corporation of Delaware Application September 30, 1929, Serial No. 396,163

13 Claims. (Cl. 254—123)

This invention relates to devices for holding the foot pedals of automobiles depressed.

It is now common practice to test the brakes of an automobile by driving the automobile upon a brake testing machine adapted to rotate the wheels of the automobile under brake resistance and indicate the turning force applied to each wheel.

When the brakes of an automobile are tested in the manner just indicated the brake pedal should be held depressed to the same degree while the readings showing the action of the brakes upon the different wheels are being taken, but it is difficult if not impossible to hold the foot pedal still in a depressed position by the foot, due to the tendency of the foot to vary the pressure upon the pedal. Furthermore it may be desirable to indicate the depressing force exerted upon the pedal.

It has been proposed heretofore to employ pedal depressors for holding the foot pedal of an automobile in the desired depressed positions, but some of these proposed constructions are more or less difficult to secure in place to act upon the pedal, while others are so constructed that they exert the depressing force upon the pedal at a pronounced angle to the direction in which the pedal was designed to be depressed.

The pedals of automobiles are designed to be depressed from the driver's seat and the driver of an automobile uses the seat and its back from which to push in depressing the pedal with his foot, and as the pedal is depressed the foot engaged portion thereof swings through an arc of a circle defined by the pedal construction. It will therefore be seen that if the pedal depressor employed to hold the pedal depressed acts upon the pedal at a pronounced angle to the direction in which the pedal was designed to be depressed, as has often been the case heretofore, instead of acting upon the pedal in the direction in which it was designed to be depressed, the actual pressure exerted upon the pedal to hold it depressed can not be accurately determined.

One important feature of the present invention therefore resides in a pedal depressor which is so constructed that it can be easily and quickly placed in and removed from a position to hold the pedal of an automobile depressed, and which is also adapted to exert the pedal depressing force upon the pedal in the direction in which the pedal was designed to be depressed.

Another feature of the invention resides in a pedal depressor that is adapted to be supported in operative position from the driver's seat of the automobile, and in adjustable means whereby the pedal depressor can be adjusted to fit different types of automobile.

Still a further feature of the invention resides in a pedal depressor provided with indicating means for indicating the force being exerted upon the pedal to hold it depressed.

The above and other features of the invention and novel combination of parts will be hereinafter described in connection with the accompanying drawings which illustrate good, practical forms of the invention.

In the drawings:

Fig. 1 is a side elevation of a pedal depressor constructed in accordance with the present invention and shown in position to hold the pedal of an automobile depressed.

Fig. 2 is a enlarged sectional view on the line 2—2 of Fig. 1.

Fig. 3 is an enlarged sectional view on the line 3—3 of Fig. 1.

Fig. 4 is a top plan view of a modified pedal depressor, and

Fig. 5 is a side elevation of the pedal depressor of Fig. 4 with parts in section.

In the embodiment of the invention shown in Figs. 1, 2 and 3 of the drawings mechanical means are employed to force the depressor against the pedal to depress the latter, whereas in Figs. 4 and 5 fluid controlled means is provided to this end. The modified construction of Figs. 4 and 5 is further provided with indicating means for indicating the pressure being exerted upon the pedal to hold it depressed. In both embodiments of the invention shown the depressor that engages the pedal is supported from the driver's seat of the automobile to exert a depressing pressure on the pedal in the direction in which it was designed to be depressed.

Referring first to the embodiment of the invention shown in Figs. 1, 2 and 3 the depressor 10 is provided at its lower end with a pedal engaging element 11 which may be variously constructed but is shown as having a long prong adapted to rest against the upper edge of the pedal and a shorter prong that may sink into the pad 12 of the foot pedal 13, as will be apparent from Fig. 1, when force is applied to the depressor 10 to move the pedal downwardly toward the floor 14.

The means shown for supporting the depressor 10 from the driver's seat consists of an angle bracket constructed so that its angle plates may be adjusted to fit the angle formed by the seat 15 and back 16 of the automobile. The angle bracket is provided with a wide plate 17 adapted to rest firmly upon the seat 15 and a wide plate 18 adapted to rest firmly against the back 16. The plate 17 is provided with the web 19' and the plate 18 is provided with the web 19 and these two webs are pivotally connected by a bolt hereinafter described so that the plates 17 and 18 may be angularly adjusted to fit the angle of the automobile seat.

The depressor 10 is connected to the angle bracket 17, 18 by the angularly disposed arms 20 and 21 which are pivotally connected for angular adjustment by the pivot pin 22, the arrangement being such that the arms may be adjusted relatively to each other to accommodate the pedal depressor to different types of automobile.

The pedal depressor may be employed to exert a depressing force of a number of pounds upon the pedal 13. It is therefore important that the angularly disposed arms be firmly connected to each other when set at the desired angle so that the angular adjustment of these arms will not change under the pedal pressure. This is accomplished in the embodiment of the invention illustrated by providing the arm 21 with the head 23 adapted to be frictionally clamped between the space plates 24 secured to the arm 20, the arrangement being such that the wing nut 25 upon the pin 22 may be actuated to effect the desired clamping action between the friction plates. In many cases a positive clamping action is desired between the angle arms 20 and 21 in addition to the friction means just described. This may be accomplished by providing the arcuate blade 26, one end of which is pivotally secured to the arm 21 by the pivot pin 27 and this blade is provided with the notches 28 adapted to receive a locking projection 29 on the bolt 30, which bolt is slidably mounted in the hollow arm 20. The bolt 30 is normally held in its blade engaging position in which it is shown in Fig. 1 by the spring 31 but may be retracted by engaging the projection 32 extending laterally from this bolt between the fingers to move the bolt to its inactive position.

The arm 20 is preferably given a telescopic construction so that its length may be varied and the arm 20 is shown as having the form of a hollow tube which may be squared in cross section as shown in Fig. 2 and is adapted to slidably receive the extension bar 33 having the bolt holes 34 adapted to receive the bolt 35 to limit the extent to which the bar 33 may be inserted in the hollow arm 20.

In the construction shown the outer end portion of the bar 33 is bifurcated to receive between the bifurcated portions the webs 19 19¹ of the angle bracket which may be frictionally secured to the bar 33 in the desired position of angular adjustment by tightening the wing nut 36 upon the pivot bolt 37. It may be desirable to positively lock the parts just mentioned together to prevent angular movement between the plates 17 and 18 and the bar 33 after these parts have been adjusted to the desired position. This is accomplished by providing the edge of the webs 19 19¹ with the teeth 38 adapted to be engaged by a latch 39 pivotally secured at 40 to the bar 33.

In the embodiment of the invention shown in Fig. 1 the downwardly extending arm 21, like the arm 20 has the form of a hollow tube which is squared in cross section and is adapted to telescopically receive the depressor 10 which preferably has the form of a relatively long bar to permit its adjustment through a relatively long range.

The means shown in Figs. 1 and 3 for forcing the depressor 10 lengthwise of the arm 21 in the pedal depressing direction has the form of a rack and gear, and the rack or depressor bar 10 is provided with the rack teeth 41 adapted to be engaged by the pinion 42 rotatably mounted within the casing 43 which casing is rigidly secured to the arm 21. The pinion 42 is mounted upon and secured to the shaft 44 adapted to be rotated by the crank handle 45. The arrangement is such that rotation of the crank handle 45 will serve to move the depressor 10 within the tubular arm 21 to depress the pedal 13, and the dogs 46 mounted upon the pivot pin 47 and actuated by the springs 48 will cause the dogs to engage the rack teeth 41 to maintain the depressor 10 in the desired position of adjustment lengthwise of the arm 21.

When the pedal depressor of the present invention is to be employed to hold a pedal depressed, the length of the arms 20, 21 and the angle between these arms and between the arm 20 and the angle bracket are adjusted to accommodate the particular automobile, so that when the angle bracket is placed upon the front seat as shown in Fig. 1, the end portion 11 of the pedal depressor will engage the raised pedal 13. The pedal is then depressed by rotating the crank handle 45 to move the depressor 10 in the pedal depressing direction, and the upward pressure which the pedal exerts upon the depressor 10 will force the upright portion 18 of the angle bracket more firmly against the back 16, and this will help to retain the pedal depressor in place as will be apparent from Fig. 1 of the drawings.

In the embodiment of the invention shown in Figs. 4 and 5 the construction and operation is the same as that of Figs. 1, 2, and 3 except that in the modified construction of Figs. 4 and 5 a fluid operated piston is employed in place of the rack and pinion to move the depressor in the pedal depressing direction, and indicating means is provided for indicating the depressing force exerted upon the pedal. In accordance with the disclosure of Figs. 4 and 5 the depressor 10 constitutes a piston rod which is provided at its inner end with a piston 49 adapted to slide within the cylinder 50, and the cylinder is provided at its lower end with a cap 51 adapted to slidably receive the piston rod or depressor 10. The arrangement is such that if air or other operating fluid is introduced into the upper portion of the cylinder 50 under pressure the piston 49 will be moved downwardly in the pedal depressing direction.

The operating fluid may be supplied to the cylinder 50 from any suitable source and in the construction shown the cylinder 50 is provided with an air valve 52 of well known construction and having an operating handle 52¹ adapted to be rotated to one position to admit air or other fluid to the cylinder 50 and to a second position to permit the fluid to exhaust from the cylinder. The outer end of the valve 52 it will be understood is connected to an air pressure pipe or other fluid pressure pipe, not shown.

As above stated it may be desirable to indicate the force maintained upon the pedal 13 to hold it depressed and this is readily accomplished in accordance with the present invention by providing the cylinder 50 with a pressure gauge or other form of indicating device 53 of well-known construction. The indicator 53 as shown is connected to the cylinder 50 by the pipe 54 to subject the pressure gauge to the air pressure within the cylinder 50 and thereby actuate the pointer 55 of the pressure gauge to indicate the force being exerted upon the depressor 10 to hold the pedal depressed.

Since in accordance with the present invention the depressor 10 is supported by the mechanism described to exert a depressing pressure upon the pedal 13 in the direction in which this pedal was designed to be depressed, the pressure indicating means just described will serve to indicate accurately the force being exerted upon the pedal to hold it depressed.

What is claimed is:

1. A device for holding the brake pedal of an automobile depressed, comprising a depressor for exerting a downward force upon the pedal in the direction in which the pedal was designed to be depressed by the foot of the automobile driver, and means for supporting the depressor from the crotch of the driver's seat of the automobile in position to hold the pedal depressed.

2. A device for holding the brake pedal of an automobile depressed, comprising a depressor for exerting a depressing force upon the pedal, means for supporting the depressor from the crotch of the driver's seat of the automobile in position to hold the pedal depressed, and an adjustable connection between the depressor and said supporting means for varying the depressing pressure exerted by the depressor upon the pedal.

3. A device for holding the brake pedal of an automobile depressed, comprising a depressor for exerting a depressing force upon the pedal, and pivotally connected means for holding the depressor from the crotch of the driver's seat of the automobile in position to retain the pedal depressed.

4. A device for holding the brake pedal of an automobile depressed, comprising a depressor for exerting a depressing force upon the pedal, and means for supporting the depressor from the crotch of the driver's seat of the automobile in position to hold the pedal depressed, including pivotally connected arms one of which extends frontwardly over the driver's seat and the other extends downwardly toward the pedal.

5. A device for holding the brake pedal of an automobile depressed, comprising a depressor for exerting a depressing force upon the pedal, and means for supporting the depressor from the crotch of the driver's seat of the automobile in position to hold the pedal depressed, including pivotally connected arms one of which extends frontwardly from the crotch of the driver's seat and the other extends downwardly toward the pedal, and a plate attached to the first mentioned arm to abut against the back of the driver's seat to take the rearward thrust of the arms.

6. A device for holding the brake pedal of an automobile depressed, comprising a depressor for exerting a depressing force upon the pedal, and means for supporting the depressor from the crotch of the driver's seat of the automobile in position to hold the pedal depressed, including pivotally connected arms one of which extends from the crotch frontwardly over the driver's seat and the other extends downwardly toward the pedal, and an adjustable connection between the arms for varying the angle therebetween.

7. A device for holding the brake pedal of an automobile depressed, comprising a pair of pivotally connected arms one being provided with means for engaging the pedal and the other provided with a member adapted to rest upon the driver's seat of the automobile and to abut the back thereof and resist the rearward thrust exerted upon said arms by the depressed pedal.

8. A device for holding the brake pedal of an automobile depressed, comprising a pair of pivotally connected arms one being provided with a depressor adapted to be adjusted to vary the depressing force exerted upon the pedal and the other having a pair of abutment plates one adapted to rest on the cushion and the other to engage the back of the driver's seat of the automobile and resist the rearward thrust exerted upon said arms by the depressed pedal.

9. A device for holding the brake pedal of an automobile depressed, comprising a pair of pivotally connected arms one being provided with means for engaging the pedal to hold it depressed, and a member for supporting the other arm having one portion adapted to rest upon the driver's seat of the automobile and another portion positioned to abut against the back of the driver's seat.

10. A device for holding the brake pedal of an automobile depressed, comprising a pair of pivotally connected arms one being provided with means for engaging the pedal and hold it depressed, a member for supporting the other arm having a portion adapted to rest upon the driver's seat and another portion engaging the back of the driver's seat of the automobile, and an adjustable connection between the member and the arm it supports.

11. A device for holding the brake pedal of a motor vehicle comprising a support adapted to rest in the crotch of the operator's seat of the vehicle, an arm pivoted thereto, an expansible element pivoted to the arm, and means for connecting the expansible element to the pedal.

12. A device for holding the brake pedal of a motor vehicle comprising a support adapted to fit in the crotch of the operator's seat of the vehicle, said support including pivotally connected members, an arm supported on the pivot connecting the members, means on the arm for locking the members against relative movement, an expansible member pivoted to the arm, and means on the expansible member for engaging the pedal.

13. A device for holding the brake pedal of a motor vehicle comprising a support adapted to fit in the crotch of the operator's seat of the vehicle including members having over-lapping flanges provided with corresponding ratchets, a pintle for pivotally connecting the flanges, an arm supported by the pintle, means carried by the arm engaging the ratchets on the flanges for securing the members against relative movement, an expansible member pivoted to the arm, means connecting the expansible member to the arm to secure these members against relative movement, and means for connecting the expansible member to the pedal.

FREDERICK W. PARKS.